United States Patent
Caveny et al.

[11] B 3,924,406
[45] Dec. 9, 1975

[54] EMBEDDED POROUS ELEMENT ROCKET MOTOR

[75] Inventors: Leonard H. Caveny, Trenton, N.J.; Martin Summerfield, Princeton, N.J.

[73] Assignee: The United States of America as represented by the Secretary of the Air Force, Washington, D.C.

[22] Filed: May 3, 1973

[21] Appl. No.: 357,039

[44] Published under the Trial Voluntary Protest Program on January 28, 1975 as document no. B 357,039.

[52] U.S. Cl. .................................................. 60/254
[51] Int. Cl.² .......................................... F02K 9/04
[58] Field of Search .......... 60/254, 234, 39.47, 253; 102/102; 110/97 D

[56] References Cited
UNITED STATES PATENTS

| | | | |
|---|---|---|---|
| 1,015,131 | 1/1912 | Bone et al. | 110/97 D |
| 3,182,451 | 5/1965 | Messerly | 60/254 |
| 3,379,178 | 4/1968 | Boyars et al. | 60/39.47 |

*Primary Examiner*—Carlton R. Croyle
*Assistant Examiner*—O. T. Sessions
*Attorney, Agent, or Firm*—Joseph E. Rusz; Arsen Tashjian; Harry A. Herbert, Jr.

[57] ABSTRACT

An apparatus for controlling the rate of burning of an end-burning solid propellant of a solid propellant rocket motor. The apparatus includes: a plenum chamber, with an outlet, with the plenum chamber disposed at the fore end of the rocket and forward of the solid propellant; a hollow conduit having two ends, with one end connected to the plenum chamber outlet, and with the other end exposed to, and within, the atmospheric environment; a valve connected to the hollow conduit at a location between the plenum chamber outlet and the atmospheric environment; and, a plurality of high-resistance gas flow paths within the solid propellant, and connecting the combustion chamber of the rocket to the plenum chamber. In a preferred embodiment each of the plurality of high-resistance gas flow paths includes a porous element which is embedded in the solid propellant, with each of the elements parallel to each other and also equally spaced from each other. The burning rate of the solid propellant surrounding the porous elements is controlled by heating the propellant adjacent to the embedded elements by regulating the back flow of hot combustion gases from the combustion chamber, through the porous elements, and into the plenum chamber. The pressure differential between the plenum chamber and the combustion chamber (and, thus, the gas back flow rate in the porous elements) can be precisely controlled by regulating (i.e., controlling) the valve which, in turn, vents the plenum chamber gases to the atmospheric environment. The apparatus does not require any special or difficult-to-use solid propellant; is light in weight, because it does not have any inert hardware; and, is easy and inexpensive to manufacture, using readily developed techniques.

3 Claims, 4 Drawing Figures

EMBEDDED POROUS ELEMENT ROCKET MOTOR

BACKGROUND OF THE INVENTION

This invention relates to a solid propellant rocket and, more particularly, to a motor thereof.

There are, and there have been for approximately the last seven years, vigorous attempts by those in the solid propellant rocket motor art to conceive, reduce to practice, and develop a solid propellant rocket motor, or a system or an apparatus therefor, which will permit the effective, reliable, and efficient control of the rate of burning of an end-burning solid propellant to be used in the rocket motor.

In effect, the attempts actually have been to obviate, or to reduce, and at the very least to minimize the shortcomings and the disadvantages of presently known systems or apparatuses which are currently used to control the burning rate of an end-burning solid propellant which, in turn, is used in or for a rocket motor. As is well known in the art, these systems or apparatuses have at least one of the following shortcomings or disadvantages: (a) they require difficult-to-use propellants (b) they incur weight penalties in the form of inert hardware; and, (c) they are expensive to manufacture.

Our invention overcomes all of these shortcomings and disadvantages, using readily available techniques, and does so without incurring any new and/or additional shortcoming and disadvantages.

We have, therefore, significantly advanced the state-of-the-art with our invention.

SUMMARY OF THE INVENTION

This invention pertains to the solid propellant rocket motor art and, more specifically, to a novel apparatus for controlling the rate of burning of an end-burning propellant of such a rocket motor.

Therefore, the principal object of this invention is to provide such a novel and much needed apparatus.

This principal object, and other equally important and related objects, of this invention will become readily apparent after a consideration of the description of the invention, coupled with reference to the drawings.

DESCRIPTION OF THE PREFERRED EMBODIMENT

Figure 1:
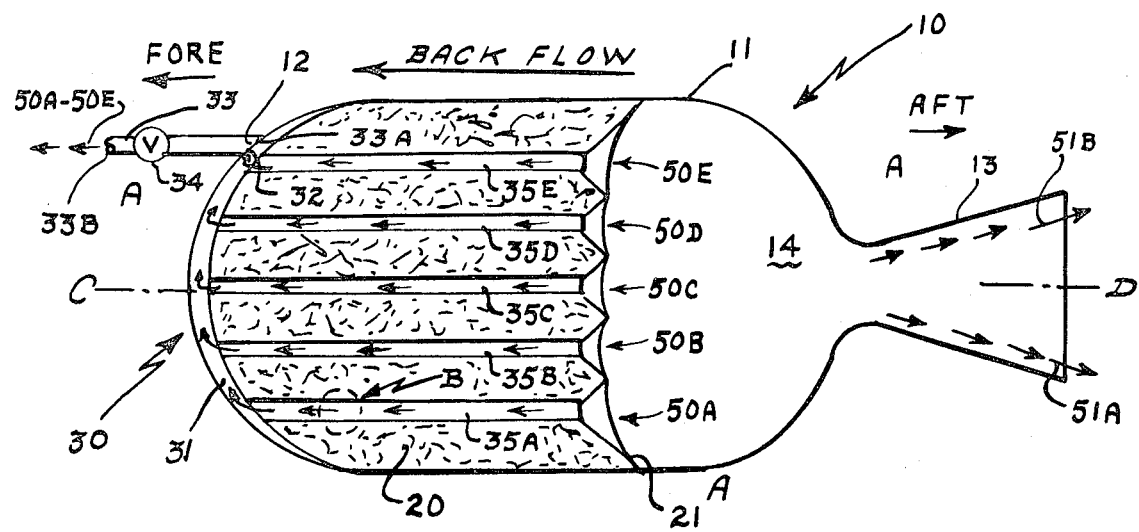
FIG. 1 is a side elevation view, in simplified schematic form, and partially in cross section, of a solid propellant rocket motor which incorporates a preferred embodiment of our invention, and in which a selected portion of the preferred embodiment of our invention is encircled for easy identification and future reference.

With reference to FIG. 1, shown therein is solid propellant rocket motor 10 which incorporates a preferred embodiment of our invention.

Rocket motor 10 is in an atmospheric environment which is generally designated as A in FIG. 1; has a fore end and an aft end, designated as such in FIG. 1, by directional arrows and appropriate legends; and includes, but is not limited to: casing 11 with an aperture or outlet 12 at the fore end of casing 11; a solid propellant grain 20 of the end-burning type within casing 11, with end 21 as the burning end, and with longitudinal axis C–D; rocket motor combustion chamber 14 disposed aft of end-burning solid propellant 20; and nozzle 13 disposed aft of the combustion chamber 14 and at the aft end of rocket motor 10 and of casing 11.

Still with reference to FIG. 1, the preferred embodiment of our invention is generally designated as 30 and includes: a plenum chamber 31 disposed in the fore end of the rocket motor 10 and of casing 11, and also disposed (i.e., forward) of the solid propellant 20, with the chamber 31 having an outlet 32 which coincides with (and, in fact, in this embodiment is the same as) aperture 12 of casing 11; a hollow conduit 33 having two ends 33A and 33B, with one end (such as 33A) connected to the plenum chamber outlet 32, and with the other end (such as 33B) exposed to, and within, the atmospheric environment A; valve 34 which is interposed between plenum chamber outlet 32 and atmospheric environment A, and is connected to hollow conduit 33; and, a plurality of paths which are highly resistant to the flow of gas, such as 35A, 35B, 35C, 35D and 35E (hereinafter referred to as "high-resistance gas flow paths," or the like), which are within solid propellant 20, and which connect combustion chamber 14 to plenum chamber 31.

The high-resistance gas flow paths, such as 35A–35E, are, but need not be, parallel to the longitudinal axis C–D of solid propellant 20; and, as a result, they are parallel to each other. Additionally, the high-resistance gas flow paths are, but also need not be, equally spaced from each other, i.e., from the adjacent paths.

Also shown in FIG. 1, is a selected portion of the preferred embodiment 30 of our invention, with the selected portion encircled and generally designated as B.

Figure 2:
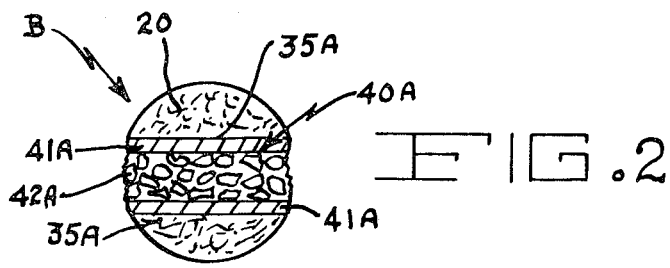
FIG. 2 is one form of the selected portion of the preferred embodiment of our invention which is encircled in FIG. 1, with the selected portion shown in a side elevation view, in simplified schematic form, in cross section, enlarged, not to scale, and in more detail than is shown in FIG. 1.

With reference to FIG. 2, therein is shown, enlarged, not to scale, and in detail, the selected portion B of preferred embodiment 30 of our invention. The view is a side elevation, in simplified schematic form, and in cross section. The representative high-resistance gas flow path 35A in solid propellant 20 may include, as shown in FIG. 2, a porous element, such as 40A, which is embedded in the solid propellant 20. Likewise, each of the other gas flow paths, such as 35B–35E, includes, as a matter of preference, a similarly embedded identical porous element. More specifically, in one form of our preferred embodiment 30 each element, such as representative porous element 40A, may include, or comprise, a hollow, thin-walled (i.e., less than 0.0025 cm), cylindrical sheath, such as representative sheath 41A, of small diameter (i.e., less than 0.3 cm), which contains therein a suitable gas flow-restricting, porous, filler material, such as representative material 42A, with the sheath, such as 41A (and, of course, the filler material 42A contained therein), embedded in the solid propellant 20. By way of illustration, and not because of any limitation, each sheath, such as representative sheath 41A, may be made of plastic or, alternatively, of aluminum.

Figure 3:
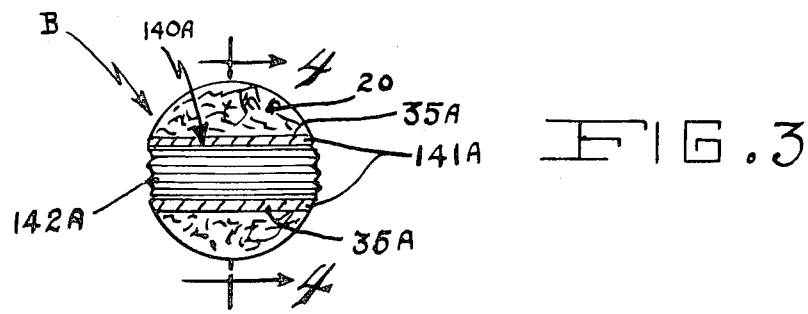
FIG. 3 is another form of the selected portion of the preferred embodiment of our invention which is encircled in FIG. 1, with the selected portion also shown in a side elevation view, in simplified schematic form, in cross section, enlarged, not to scale, and in more detail than is shown in FIG. 1.

With reference to FIG. 3, therein is shown another form of the selected portion, generally designated as B in FIG. 1, of the preferred embodiment 30 of our invention. The view is a side elevation, in simplified schematic form, in cross section, enlarged, not to scale, and in more detail than is, or could be, shown in FIG. 1. In the form shown in FIG. 3, the representative high-resistance gas flow path 35A in solid propellant 20 may include, as shown in FIG. 3, a porous element, such as 140A, which is embedded in the solid propellant 20. Likewise, each of the other high-resistance gas flow paths, such as 35B–35E, includes, also as a matter of preference, a similarly embedded identical porous element. Specifically, in this form of our preferred embodiment 30, each element, such as representative porous element 140A, may include, or comprise, a hollow, thin-walled (i.e., less than 0.0025 cm) metal tube, such as representative metal tube 141A, of small diameter (i.e., less than 0.3 cm), which contains therein a gas flow restrictor, such as representative restrictor 142A, preferably made of plastic, such as "Teflon," with the metal tube, such as 141A (and the gas flow restrictor 142A therein), embedded in the solid propellant 20. The metal tube, such as 141A, could appropriately be made of aluminum; and, the gas flow restrictor 142A could be (instead of a plastic restrictor) an active packing, such as of ammonium percholate, particularly if the solid propellant, such as 20, has a very low flame temperature.

Figure 4:
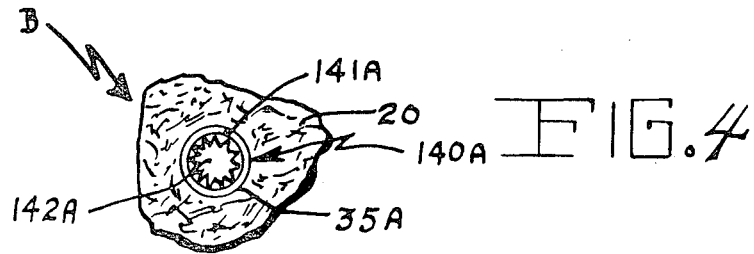
FIG. 4 is a view, taken along line 4—4 of FIG. 3, in simplified schematic form, in cross section, and partially fragmented, of the selected portion of the preferred embodiment shown in FIG. 3.

With reference to FIG. 4, therein is shown, in a view taken along line 4—4 of FIG. 3, the selected portion of the preferred embodiment shown in FIG. 3. The selected portion, as shown in FIG. 4, is in simplified schematic form, in cross-section, and partially fragmented. In the form shown in FIG. 4, the representative high-resistance gas flow path 35A in solid propellant 20 includes the porous element 140A embedded in solid propellant 20. As previously stated, each of the other of the plurality of high-resistance gas flow paths, such as 35B–35E, includes an identical porous element, as a matter of preference and not of limitation. Each of the porous elements, such as representative element 140A, includes a hollow, thin-walled, small diameter, metal tube 141A, preferably made of aluminum, with a gas flow restrictor 142A, preferably made of plastic such as Teflon, therein. Each of the metal tubes, such as 141A, is embedded in the solid propellant 20. As stated heretofore, an active packing, such as of ammonium percholate, may be substituted for the plastic restrictor 142A.

MODE OF OPERATION OF THE PREFERRED EMBODIMENT

The mode of operation of the preferred embodiment 30 of our invention is self-evident and is easily understood from the foregoing description, coupled with reference to the drawings.

Succinctly, and with reference to the various different forms of the high-resistance gas flow paths 35A–35E, FIGS. 1–4, and the porous element(s), such as 40A, FIG. 2, and 140A, FIGS. 2 and 3, the burning rate of the end-burning solid propellant 20, which surrounds the gas flow paths and the porous elements except for the ends thereof, is controlled simply by regulating the back flow (as indicated by the directional arrow and the legend in FIG. 1, and as represented by gas flow arrows 50A–50E) of the hot combustion gas through the porous elements. In turn, the back flow 50A–50E, FIG. 1, is controlled by regulating the valve 34, FIG. 1, that vents the plenum 31 to the atmosphere A, FIG. 1.

Sequentially what occurs is that the rocket motor 10 is actuated by igniting the burning end 21 of solid propellant grain 20 by suitable conventional means, such as by and with an electric igniter squib (not shown, in the interest of maintaining simplicity of the drawing). The propellant burns, forming combustion gases, such as 50A–50E and 51A and 51B. Some of the gases, such as 51A and 51B flow aft, out of the combustion chamber and into, and through, the nozzle 13, resulting in rearward thrust which, in turn, causes forward movement of casing 11 and of rocket motor 10 as a whole.

Then valve 34 is remotely actuated, and is regulated to the "fully open," "closed," or an "intermediate open" position, by suitable conventional means, such as a command control electromagnetic signal. In the fully open position, or in any intermediate open position, some of the hot combustion gases, such as 50A–50E, flow from the higher pressure combustion chamber 14 to the lower pressure plenum chamber 31, due to the pressure differential. Additionally, because the interposed gas flow paths, such as 35A–35E, and/or the embedded porous elements, such as the type designated as 40A or 140A, provide high-resistance (and slowed-up movement) to the back flow, and further because the gas flow paths and the embedded porous elements rapidly transfer heat from the flowing combustion gases to the propellant adjacent to the embedded elements. Since the propellant is heated, its burning rate is accelerated. By controlling the magnitude of back flow, the extent to which the propellant is heated is controlled and, thus, the degree of burning acceleration is controlled. Thereby, command control of the burning rate is achieved. The combustion gases that reach the plenum chamber are cool.

The result is that the rate of burning of the solid propellant 20 is effectively controlled.

CONCLUSION

It is clear from the foregoing description and from the drawings herein, that the principal object of our inventive apparatus has been attained, and also that our invention overcomes all of the shortcomings and disadvantages of the know prior art.

In addition, while there have been shown and described the fundamental unique features of our invention, as applied to a particular preferred embodiment, it is to be understood that various other embodiments, substitutions, additions, omissions, adaptations, and the like, can be made by those of ordinary skill in the art, without departing from the spirit of our invention. For example, our invention may be adapted for use as a gas generator. Further, the embedded porous elements, such as 40A and 140A, could be made from any of various relatively inert materials with ignition temperatures between 800° and 1,500° Kelvin.

What we claim is:

1. An apparatus for controlling the rate of burning of an end-burning solid propellant of a solid propellant rocket motor, wherein said rocket motor is in an atmospheric environment and wherein the rocket motor includes a casing having a fore end and an aft end, and also wherein the rocket motor has an end-burning solid propellant in the casing, a combustion chamber which is disposed aft of the end-burning solid propellant, and a nozzle which is disposed aft of the combustion chamber, and further wherein the end-burning solid propellant has a longitudinal axis, comprising:
  a. a plenum chamber disposed in the fore end of the rocket motor casing and forward of the solid propellant, with said plenum chamber having an outlet;
  b. a hollow conduit having two ends, with one end connected to the outlet of said plenum chamber, and with the other end exposed to, and within, the atmospheric environment;
  c. a valve interposed between the outlet of said plenum chamber and the atmospheric environment, and with said valve connected to said hollow conduit;
  d. and, a plurality of high-resistance gas flow paths within the solid propellant, with said gas flow paths connecting the combustion chamber to the plenum chamber, wherein each of the plurality of high-resistance gas flow paths is parallel to the longitudinal axis of the solid propellant, and wherein each of the plurality of high-resistance gas flow paths is also equally spaced from each other, and also wherein each of the plurality of high-resistance gas flow paths includes a porous element which is embedded in the solid propellant, with each said porous element comprising a hollow, thin-walled, cylindrical plastic sheath of small diameter which contains therein a suitable gas flow-restricting, porous, filler material, said filler material being an active packing of reactive material.

2. The apparatus, as set forth in claim 1, wherein each said hollow, thin-walled, cylindrical plastic sheath of small diameter has a ridged internal surface.

3. The apparatus, as set forth in claim 1, wherein said active packing of reactive material is ammonium percholate.

* * * * *